United States Patent [19]

Loeb

[11] Patent Number: 5,152,250
[45] Date of Patent: Oct. 6, 1992

[54] AGGLOMERATING BIODEGRADABLE ANIMAL LITTER AND METHOD OF MANUFACTURE

[75] Inventor: Herman R. Loeb, Montgomery, Ala.

[73] Assignee: Clump & Flush, Inc., Pintlala, Ala.

[21] Appl. No.: 822,648

[22] Filed: Jan. 21, 1992

[51] Int. Cl.⁵ .............................................. A01K 29/00
[52] U.S. Cl. ................................................... 119/171
[58] Field of Search ....................... 119/171, 172, 173

[56] References Cited

U.S. PATENT DOCUMENTS

| | | | |
|---|---|---|---|
| 4,676,196 | 6/1987 | Lojek et al. | 119/172 |
| 4,727,824 | 3/1988 | Ducharme et al. | 119/171 |
| 4,883,021 | 11/1989 | Ducharme et al. | 119/171 |

*Primary Examiner*—Gene Mancene
*Assistant Examiner*—Thomas Price
*Attorney, Agent, or Firm*—Jennings, Carter, Thompson & Veal

[57] ABSTRACT

A clumping biodegradable animal litter and method for manufacturing such litter. The animal litter includes a biodegradable carrier such as granulated peanut shells having a grain flour intermixed therewith and attached thereto with oil. The carrier will absorb liquid applied thereto which will interact with the flour to facilitate the agglomeration of the carrier, flour and liquid into a mass having sufficient cohesive strength to allow physical removal of the agglomerated mass.

6 Claims, 1 Drawing Sheet

AGGLOMERATING BIODEGRADABLE ANIMAL LITTER AND METHOD OF MANUFACTURE

Field of the Invention

The present invention relates to a composition for absorbing animal urine and a method of manufacturing the composition. More particularly the present invention relates to an absorbent composition that agglomerates when liquids are applied thereto such that the agglomerated mass of composition and liquid have a cohesive strength sufficient to allow removal of the agglomerated mass.

Background of the Invention

Animal litter is a well known product commonly used as an absorbent for animal urine. The litter is typically contained in a specific area such as a litter box in which the animal has been trained to urinate or spread across the floor of a limited cage space within which the animal is contained. Most animal litters will not absorb urine efficiently, rather, the urine accumulates at the bottom of the litter box and dampens a large mass of litter. The animal litter must soon be replaced as the odor from the urine becomes objectionable. Because liquids are not confined by the soiled litter, the soiled litter and the clean litter are not easily separable; thus, the entire box of litter is usually disposed of and replaced. The container holding the litter must be washed because the urine commonly migrates through the semi-absorbent litter and soils the container.

One such litter box absorbent material is described in Lohman U.S. Pat. No. 4,570,573 and comprises 60-94% by weight paper, about 1-35% calcium sulfate and 3-12% water. This material absorbs urine but does not eliminate the disadvantage of periodically replacing the entire contents of the litter box.

To accommodate the disadvantage of replacing the entire animal litter, Stuart, in U.S. Pat. No. 4,685,420 suggested that a water absorbent polyacrylate in combination with other absorbent material would act to gel the urine and absorbent material such that the gel could be separated from the unsoiled litter and removed. The problem with using polyacrylate is that such material is relatively expensive compared to existing litters and thus not financially feasible as a marketable litter material.

Hughes, in U.S. Pat. No. 5,000,115, disclosed that granulated bentonite clay was particularly suitable as a litter because the granulated bentonite clay, when contacted by animal waste liquid, would agglomerate with other wetted particles of bentonite to form a mass that was removable from the unsoiled litter. The clay was inexpensive and thus practical as a marketable litter.

Though allegedly efficient to agglomerate when contacted with animal urine, the bentonite clay disclosed in Hughes and the polyacrylate disclosed in Stuart share a common problem. Neither the clay nor the polyacrylate gel are flushable in homes in which a septic tank is used as a means for sewage disposal. Being non-biodegradable the bentonite clay and polyacrylate will accumulate in the septic tank and may block the septic tank outlets and thus stop the flow of waste water from the home. Also, it has not been shown that bentonite deposits are acceptable in municipal systems. As it is preferable to flush the removed litter rather than contain it in or around the home, the polyacrylate gel and bentonite clay appear to be less desirable than other absorbents that are biodegradable.

Biodegradable litters such as that previously described in Lohman are well known in the industry. Harrison, in U.S. Pat. No. 4,821,677, discloses a litter in which peanut shells are utilized as an absorbent; however, until the present invention, no biodegradable litter was known that would absorb urine and agglomerate into a removable mass such that the soiled litter can be separated from unsoiled litter.

SUMMARY OF THE INVENTION

It is the principal object of the present invention to provide an absorbent animal litter.

In support of the principal object, another object of the present invention is to provide an absorbent animal litter that agglomerates when liquid is applied thereto such that the agglomerated mass and absorbed liquid can be removed from the dry animal litter.

Yet another object of the present invention is to provide an absorbent, agglomerating animal litter that is completely biodegradable such that the litter may be flushed into a septic tank or other sewage unit using natural decomposition as a method of disposal.

These and other objects and advantages of this invention are accomplished through the use of a biodegradable carrier such as peanut shells that have been granulated to a selected range of particle sizes. Grain flour is intermixed with the carrier at selected ratios and attached to the carrier with a mineral oil that is sprayed on the grain flour and carrier during the mixing process. When selected fluids, including animal urine, are applied to the granulated animal litter the wetted flour and carrier absorb the liquid which facilitates the agglomeration of the wetted flour and carrier into a mass having sufficient cohesive strength to allow removal of the agglomerated mass from the unsoiled animal litter.

BRIEF DESCRIPTION OF THE DRAWINGS

Apparatus embodying features of this invention are depicted in the accompanying drawings which form a portion of this disclosure and wherein.

DESCRIPTION OF A PREFERRED EMBODIMENT

Figure 1:
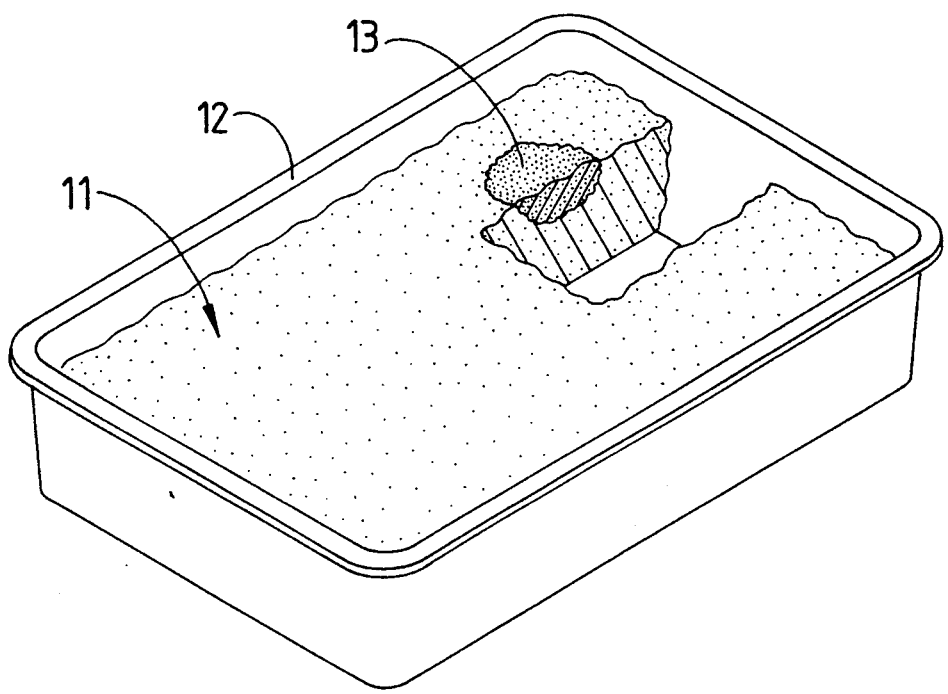
FIG. 1 is a perspective view partly broken away and in section showing a litter box containing clean litter and an agglomerated mass of litter.
Figure 2:
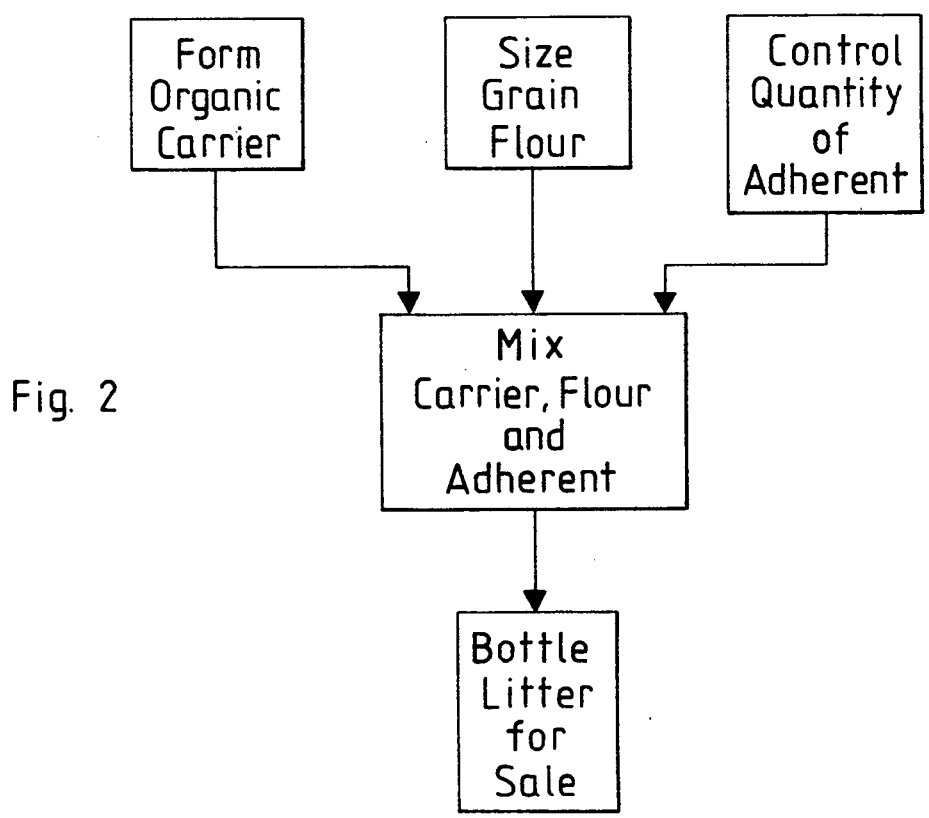
FIG. 2 is a block diagram of the process used to manufacture our litter.

Referring to the drawings for a clearer understanding of the invention, it should be noted in FIG. 1 that the present invention is a granulated animal litter 11 that may be contained within a litter box 12 or spread across the flooring of an animal's cage (not shown). The litter 11 includes a granulated biodegradable carrier, preferably an organic matter such as peanut shells. Peanut shells are absorbent, available in large quantities and at relatively low cost and are easily granulated to a selected range of particle sizes. Two of the many alternate organic carriers are pecan shells and cob grit which is the organic material derived from predried and granulated corn cobs. The preferred size of the carrier ranges from 8-60 United States Screen Size (USSS). The method of granulating the carrier is set forth herein.

The present invention further includes a quantity of grain flour intermixed with the granulated carrier and a quantity of adhering agent for cohesion purposes. The preferred adhering agent is mineral oil, but one skilled in the art will readily recognize that other non-aqueous liquids having similar adhering abilities could be used. For example, vegetable oils may be used. Note that the carrier, flour and adhering agent may all be biodegradable and thus, will naturally decompose within a septic tank. The grain flour can be processed from most botanical sources using methods commonly known in the industry. Corn or wheat flours are exemplary of the preferred grain flours that may be used but do not comprise the entire spectrum of grain flour contemplated by this invention. The grain flour must be granulated to a selected range of particle sizes. The preferred sizes range from 80-200 microns.

The present invention is manufactured by grinding a quantity of peanut shells with a 5/16 hammer screen, an apparatus commonly known for use as a grinder. The ground peanut shells are compacted into pellets of selected size and dimension and reground with a roller mill cracker which is also commonly known in the industry. The reground peanut shell is screened and those peanut shell particles ranging from 8-60 United States Screen Size are selected for use in the present invention. The selected peanut shell particles are introduced within a rotary blender at a predetermined rate with a quantity of grain flour of selected particle size that is simultaneously introduced within the mixer at a selected rate. As the peanut shells and grain flour are introduced within the mixer, a quantity of adherent is sprayed on the grain flour at a selected rate. The preferred percentage of grain flour per total volume of mixture ranges from about 6% to about 12% by weight with 12% being the optimal percentage of flour. Percentages of flour greater than 12% tend to make the litter overly dusty. The mineral oil is sprayed at a rate of about 0.5% by weight mineral oil per total weight of mixture. The mineral oil has a viscosity ranging from about 40 to about 100 centipoise. Color pigment may be added to the mixture as desired. The mixture of carrier, grain flour and mineral oil should be mixed for at least three minutes to completely attach the flour to the carrier. The litter is the bottled and sold for household use.

The present invention is particularly effective in agglomerating aqueous based liquids such as animal urine. Urine deposited on the litter causes delamination of the grain flour and carrier and facilitates the agglomeration of the grain flour, carrier and urine into a mass 13 of sufficient cohesive strength to allow physical removal of the agglomerated mass 13 from the unsoiled litter 11. The mass can be removed using a sieved spoon or shovel that will lift the agglomerated mass 13 while permitting the smaller unsoiled litter 11 to remain within the container 12. Once removed, the agglomerated mass 13 may be placed within a commode or similar flushable unit and flushed into the sewer or septic tank system. The litter 11 is particularly suitable for flushing as its components are biodegradable and will not clog in-house piping or septic tank ports. From the foregoing, it should be clear that the present composition and method of manufacture represent a substantial improvement over the prior art.

While I have shown my invention in one form, it will be obvious to those skilled in the art that it is not so limited but is susceptible of various changes and modifications without departing from the spirit thereof.

What I claim is:

1. A clumping biodegradable animal litter comprising:
    (a) a granulated biodegradable carrier;
    (b) a quantity of grain flour for interacting with waste liquids deposited thereon which facilitates the agglomeration of said grain flour, carrier and liquids into a mass of sufficient cohesive strength to allow physical removal of the agglomerated mass; and
    (c) means for improving the adherence of said grain flour to said carrier comprising a quantity of mineral oil.

2. A clumping biodegradable animal litter as defined in claim 1 wherein said carrier comprises granulated organic matter.

3. A clumping biodegradable animal litter as defined in claim 1 wherein said carrier comprises granulated peanut shells.

4. A clumping biodegradable animal litter as defined in claim 1 wherein said carrier comprises granulated cob grit.

5. A clumping biodegradable animal litter as defined in claim 1 comprising:
    (a) about 6% to 12% by weight of said grain flour; and
    (b) about 0.5% by weight of said improving means.

6. A clumping biodegradable animal litter as defined in claim 1 wherein said grain flour ranges in particle size from about 80 to 200 microns.

* * * * *